Feb. 9, 1960  B. C. BENEDICT  2,924,590
METHOD OF SEPARATING GRANULAR CATALYST FROM A LIQUID
Filed Jan. 9, 1956
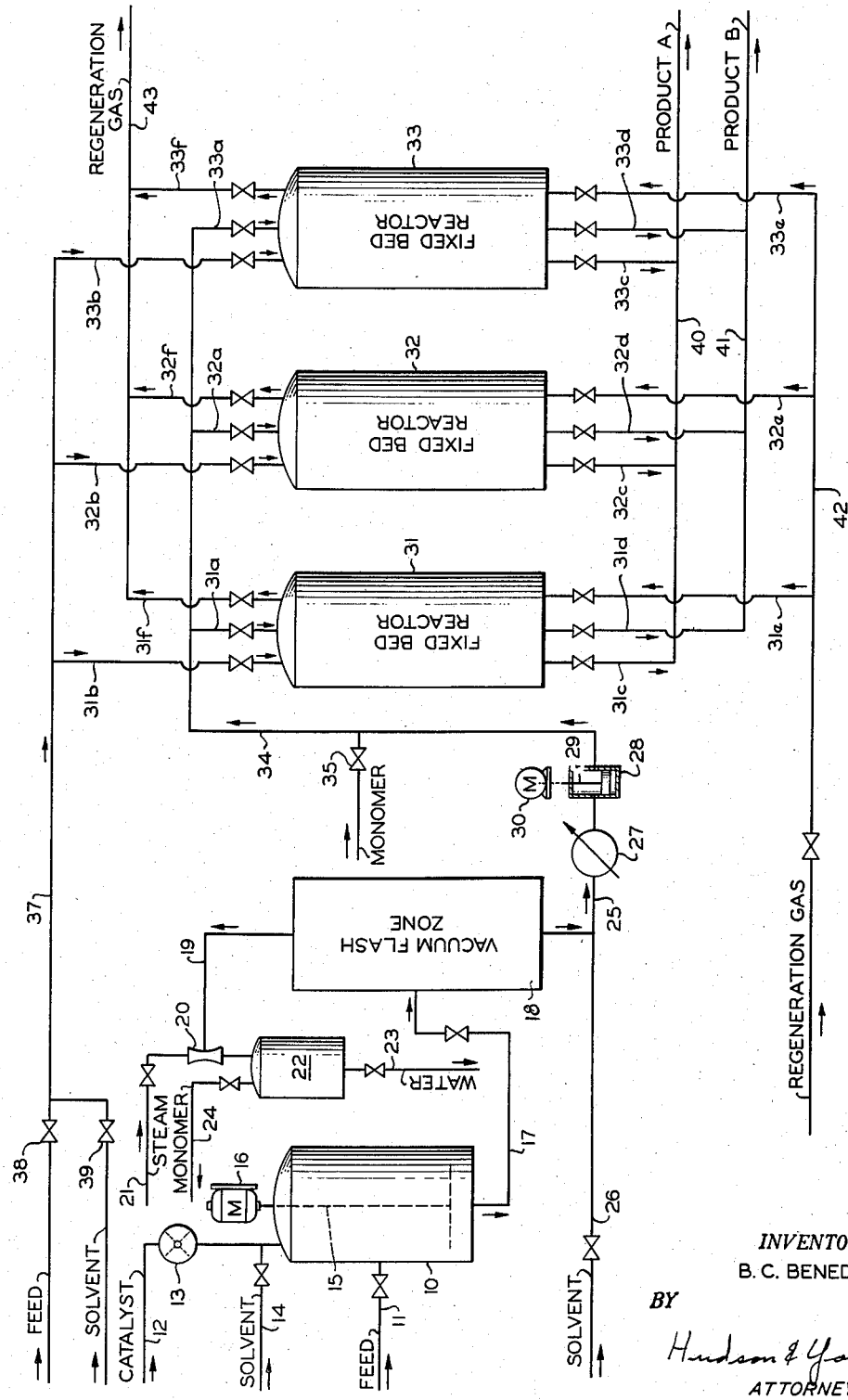
INVENTOR.
B. C. BENEDICT
BY
Hudson & Young
ATTORNEYS

United States Patent Office 2,924,590
Patented Feb. 9, 1960

2,924,590

METHOD OF SEPARATING GRANULAR CATALYST FROM A LIQUID

Bruce C. Benedict, Bartlesville, Okla., assignor to Phillips Petroleum Company, a corporation of Delaware Application January 9, 1956, Serial No. 558,082

9 Claims. (Cl. 260—88.2)

This invention relates to a method of separating granular catalyst from a liquid.

Heretofore, processes have been devised for producing olefin polymers in liquid phase in the presence of a solvent and a finely divided catalyst. Such a process for producing polymers having unique characteristics is described in copending applications Serial No. 476,306, filed December 20, 1954, now abandoned, by J. P. Hogan and R. L. Banks and Serial No. 496,515, filed March 24, 1955, by M. R. Cines.

In accordance with this invention, the catalyst is removed from a liquid reaction effluent containing finely divided catalyst by passing same through a fixed or moving bed catalytic reactor wherein the finely-divided particles are retained by the fixed or moving bed as the liquid passes therethrough. This same bed is subsequently utilized for the catalytic conversion of further quantities of feed which is passed therethrough during a process cycle. Also, the fixed or moving bed catalyst is periodically regenerated, and the regeneration gases can be advantageously passed through the bed at such velocity as to entrain and carry away "fines" deposited on the fixed or moving bed during passage of the liquid reaction effluent therethrough. In some instances, additional feed can be added to the effluent from the liquid phase catalytic reaction before it is passed into the aforementioned catalyst bed, in which case additional product is formed at the same time the granular catalyst is removed by passage of the solution through the catalyst bed.

Accordingly, it is an object of the invention to provide an improved catalytic process for the separation of granular catalyst from a liquid reaction effluent.

It is a further object to utilize one or more fixed bed catalytic reactors in conjunction with a liquid phase catalytic reactor.

It is a still further object to provide an efficient and economical system for the removal of granular catalyst from the effluent of a liquid phase polymerization reactor.

Various other objects, advantages and features of the invention will become apparent from the following detailed description taken in conjunction with the accompanying drawing in which:

The figure is a flow diagram illustrating the system of the invention.

Referring now to the drawing in detail, the material to be converted is fed to a liquid phase catalytic reactor 10 through a valved line 11. A granular catalyst enters the reactor through a line 12 controlled by a star valve 13, and this catalyst can be admixed with a solvent introduced through a valved line 14 before it enters the reactor. Preferably and advantageously, the reactor is provided with a stirrer 15 driven by a motor 16.

The effluent from the reactor, containing the reaction product dissolved in the solvent together with the finely divided catalyst particles and some unreacted feed, is passed through a line 17 to a vacuum flash unit 18. From this unit, the unreacted feed passes overhead through a line 19 whence it passes to a steam jet ejector 20 to which steam is applied through a pipe 21. Cooperating with the ejector 20 is a condenser 22 from which water is withdrawn downwardly from a valved line 23 and the unreacted material is taken overhead through a valved line 24, for recycle if desired.

The bottoms product from the flash unit 18 is withdrawn by a line 25 and admixed with additional quantities of solvent which are introduced through a valved pipe 26. This mixture then passes through a heater 27 to a surge vessel 28 equipped with a stirrer 29 driven by a motor 30. In the heater and vessel, any product is dissolved which may have been deposited on the catalyst particles.

From the vessel 28, the mixture passes to one of a plurality 31, 32 and 33 of fixed bed catalytic reactors. These reactors are provided, respectively, with valved inlet lines 31a, 32a and 33a which are connected to a common discharge header 34 leading from the vessel 28 to admit the mixture to the fixed bed reactors, as desired. A line 35 branches from the line 34 to admit additional feed for admixture, in certain embodiments of the invention, with the effluent from the reactor 10.

The reactors 31, 32 and 33 are further provided with inlet lines 31b, 32b and 33b, respectively, which communicate with a common header 37 to which feed can be introduced through a valved line 38 and solvent can be introduced through a valved line 39. The reactors are also provided with the respecitve sets 31c, 32c, 33c and 31d, 32d, 33d of lines which lead to a header 40 for withdrawing a product A from the reactors, as desired, and a header 41 for withdrawing a product B.

A regeneration gas, such as oxygen-containing flue gas, can be introduced to the reactors through a header 42, and a set 31e, 32e and 33e of catalyst regeneration gas inlet pipes, the spent regeneration gas leaving through a set 31f, 32f, 33f of regeneration gas outlet pipes which communicate with a common regeneration gas outlet header 43.

In operation, each of the reactors 31, 32 and 33 passes through three cycles of operation. In the first cycle, the effluent from vessel 28 passes through the reactor, and the finely divided suspended catalyst therein is deposited upon the fixed catalyst bed. The converted material dissolved in solvent is then withdrawn through header 40 for treatment in any suitable manner to separate the product from the solvent. At the end of this step, it is oftentimes desirable to introduce solvent from line 39 to wash product from the fixed bed of catalytic material.

In the second cycle, additional feed and solvent from lines 38, 39 are introduced to the catalyst bed after shutting off the flow of mixture thereto from vessel 28. Thereupon, a catalytic conversion reaction takes place in the fixed bed to produce a second product which is withdrawn through header 41 and separated from solvent in any suitable manner.

During the third cycle of operation, regeneration gas is admitted to the catalyst bed to regenerate the catalyst, and the spent regeneration gas is withdrawn through the header 43. It is a feature of the invention that, during this regeneration step, the finest catalyst particles deposited upon the bed during the passage therethrough of the mixture from vessel 28 are caught up in the gas stream and thus removed from the system. Thus, by the system of the invention, no accumulation of fines occurs in the catalyst bed.

As a further feature of the invention, additional feed material can be introduced through the line 35 along with the mixture from vessel 28. This material is converted in the catalyst bed at the same time the finely divided catalyst is being taken out of the effluent mixture from reactor 10.

Those skilled in the art will understand that the reactors 31, 32 and 33 are sequentially operated so that each of them, at any one time, is passing through a different one of the three operating cycles previously described.

As a specific embodiment of the invention, I will now describe a process for the polymerization of ethylene by the method of the invention but it will be understood that the process is applicable to various other types of liquid phase catalytic conversion reactions, as well as the polymerization of various types of olefinic materials as will be pointed out more fully hereafter.

In the production of polyethylene, the feed is ethylene of 95 percent purity containing small quantities of methane, ethane and/or carbon dioxide, and preferably treated to remove oxygen. This material is fed at a rate of 14.6 cubic feet per hour to the reactor together with one gallon per hour of isooctane solvent introduced through line 13 together with sufficient chromium oxide on silica-alumina catalyst to maintain 0.1 to 0.5, specifically 0.3 weight percent, catalyst in the effluent. The reactor is operated at a temperature of 285° F. and a pressure of 500 pounds per square inch gage, i.e., sufficient to maintain a liquid phase in the reactor. The reactor effluent contains 0.3 weight percent catalyst, 7.2 weight percent polyethylene, 7.2 percent ethylene, 0.7 percent light gaseous impurities and 84.6 percent solvent.

The flash zone 18 is maintained at the same temperature as the reactor, and is operated at a pressure of 33 p.s.i.g. The effluent from the flash zone is essentially free from unreacted ethylene, and it is admixed with solvent from the line 26 in a sufficient amount to provide a solution containing 10 percent by weight of polymer. In the heater 27, the temperature is raised to 335° F., at which temperature the material enters one of the fixed bed reactors 31, 32 or 33. This heating causes the solvent to dissolve off most of the polymer coating on the catalyst, and, in the agitator vessel 28, the hot solvent and polymer coated catalyst are intimately mixed, thereby substantially completely removing the polymer from the catalyst. After passage of the mixture from vessel 28 through the fixed bed, isooctane solvent from line 39 is passed therethrough to wash off any polyethylene deposited on the fixed bed catalyst.

Thereupon, ethylene feed and solvent are introduced through lines 38 and 39. The fixed bed catalyst is chromium oxide supported on silica-alumina and, during the reaction period, the polymerization takes place at a temperature of 300° F., a liquid hourly space velocity of 3, and an olefin concentration of 3 weight percent under a pressure sufficient to maintain liquid phase conditions.

After the polymer is formed, it is removed or washed off the catalyst by isooctane solvent at a temperature of about 350° F., and the regeneration takes place with dry air diluted with inert gas, e.g., flue gas, at a temperature of about 950° F.

It will be understood that the specific operating conditions hereinbefore given can vary to some extent depending upon the type of product desired, and the nature of the olefin charge. The following table exemplifies the ranges within which the aforementioned variables may be set.

Table

| | |
|---|---|
| Reactor 10: | |
| Temperature — olefin polymerization | 150 to 450° F. |
| Preferred temperature—ethylene | 200 to 350° F. |
| Preferred temperature—propylene | 150 to 250° F. |
| Preferred temperature—ethylene, propylene copolymer | 240 to 320° F., preferably 250 to 280° F. |
| Pressure | Sufficient to maintain a liquid phase, preferably 500 p.s.i.g. |
| Catalyst concentration | 0.01 to 10 weight percent based on 100 parts of the solvent, preferably 2 to 10 weight percent. |
| Olefin concentration in feed | 0.1 to 40 weight percent, preferably 0.5 to 10 weight percent. |
| Contact time | 2 minutes to 10 hours, preferably 30 to 300 minutes. |
| Flash zone: | |
| Temperature | Same or higher than reaction temperature. |
| Pressure | Not critical, usually subatmospheric. |
| Effluent | Substantially free of olefin. |
| Solvent added through line 26 | Sufficient to provide polymer concentration below 15 weight percent, preferably 5 to 10 weight percent. |
| Temperature produced by heater 37 | At least the melting point of polymer 250–400° F., preferably 275–350° F. |
| Fixed bed reactors: | |
| Polymerization temperature | 150–450° F. |
| Preferred temperature for propylene and higher olefins | 150–250° F. |
| Preferred temperature for ethylene | 275–375° F. |
| Preferred temperature for ethylene-propylene copolymer | 250–290° F. |
| Pressure | Sufficient to maintain liquid phase. |
| Feed rate | 0.1–20 LHSV, preferably 1–6 LHSV. |
| Olefin concentration | 0.1–10 weight percent, preferably 2–4 weight percent. |
| Wash temperature | 300–400° F. |
| Regeneration temperature | 900–1100° F. |

It will be understood that the invention is not limited to ethylene polymerization but can be very advantageously applied to the production of homopolymers or copolymers of 1-olefins having no more than 8 carbon atoms with no branching nearer the double bond than the 4-position. For example, polymerization of propylene, 1-octene and the like, can be advantageously conducted, as well as polymerization of diolefins or conjugated diolefins of no more than 8 carbon atoms.

The polymerization catalyst can advantageously be chromium oxide supported on silica, alumina or silica-alumina. However, various other polymerization catalysts can be used, and various materials, such as thoria and zirconia are suitable as supports and have catalytic activity. Additional promoters such as zinc oxide, magnesium oxide, strontium oxide, and the like can be employed. Also, various solvents can be utilized provided that they do not impair the activity of the catalyst. Thus aliphatic and alicyclic hydrocarbons of 3 to 12 carbon atoms preferably 5 to 12 carbon atoms per molecule are suitable, specifically propane, normal butane, cyclohexane, methylcyclohexane and isooctane.

While the invention has been described in connection with a present, preferred embodiment thereof, it is to be understood that this description is illustrative only and is not intended to limit the invention.

I claim:

1. In the polymerization of hydrocarbon 1-olefins in liquid phase in a hydrocarbon solvent and in contact with a granular chromium oxide catalyst, the improvement comprising passing said olefin, solvent and granular catalyst through a first polymerization zone, removing an effluent from said polymerization zone comprising solvent having polymer dissolved therein along with said granular catalyst in suspension; passing said effluent through a fixed bed of additional chromium oxide catalyst whereby granular catalyst is deposited upon the fixed bed; passing additional 1-olefin in solvent through the fixed bed to polymerize said additional 1-olefin; and subsequently passing an oxidizing gas through said fixed bed to remove carbonaceous deposits from said catalyst.

2. The improvement of claim 1 wherein the fixed bed after deposition of catalyst is washed free of polymer by passing solvent free of polymer, monomer, and catalyst through said fixed bed prior to passing additional 1-olefin in solvent through said fixed bed.

3. The improvement of claim 2 wherein the oxidizing gas is passed through said fixed bed at such a velocity as to suspend and carry away the most finely divided particles of said catalyst from said fixed bed.

4. The improvement of claim 2 wherein the 1-olefin is a mono-1-olefin of 2 to 8 carbon atoms and the said chromium oxide catalyst is supported on an oxide selected from the group consisting of silica, alumina, and silica-alumina.

5. The improvement of claim 4 wherein the 1-olefin is ethylene.

6. The improvement of claim 4 wherein the 1-olefin is propylene.

7. The improvement of claim 4 wherein the 1-olefin is a mixture of ethylene and propylene.

8. The method of producing polymers of 1-olefin which comprises passing a hydrocarbon 1-olefin of 2 to 8 carbon atoms in contact with a hydrocarbon solvent and a granular chromium oxide catalyst through a first polymerization zone; removing an effluent from said first polymerization zone comprising unpolymerized olefin, polymer, solvent and granular catalyst in suspension having polymer dissolved thereon; vacuum distilling said effluent to remove unpolymerized olefin; adjusting the polymer concentration in the solvent to less than 15 weight percent; heating and agitating the resulting solution to dissolve polymeric material deposited on catalyst; passing the resulting mixture through a fixed bed of additional chromium oxide catalyst whereby the granular catalyst suspended in the solvent is deposited on said fixed bed; and passing additional 1-olefin of 2 to 8 carbon atoms in solvent through the fixed bed to polymerize said additional 1-olefin.

9. In the polymerization of hydrocarbon 1-olefins in liquid phase in a hydrocarbon solvent and in contact with a granular chromium oxide catalyst, the improvement comprising passing said olefin, solvent and granular catalyst through a first polymerization zone; removing an effluent from said polymerization zone comprising solvent having polymer dissolved therein along with said granular catalyst in suspension; passing said effluent through a fixed bed of additional chromium oxide catalyst whereby granular catalyst is deposited upon the fixed bed; and passing additional 1-olefin in solvent through the fixed bed to polymerize said additional 1-olefin.

References Cited in the file of this patent

UNITED STATES PATENTS

| | | |
|---|---|---|
| 2,018,507 | Alton | Oct. 22, 1935 |
| 2,617,709 | Cornell | Nov. 11, 1952 |
| 2,702,288 | Hoeksema et al. | Feb. 15, 1955 |
| 2,726,234 | Field et al. | Dec. 6, 1955 |
| 2,728,754 | Evering et al. | Dec. 27, 1955 |
| 2,731,452 | Field et al. | Jan. 17, 1956 |

OTHER REFERENCES

Perry: Chemical Engineers Handbook (1950), page 968 (Granular Beds), McGraw-Hill Book Company, New York.